United States Patent
Alarcon et al.

(10) Patent No.: US 10,473,925 B2
(45) Date of Patent: Nov. 12, 2019

(54) SYSTEM AND METHOD FOR UTILIZING INERTIAL FORCE FOR WATER DISPLACEMENT

(71) Applicant: GM Global Technology Operations LLC, Detroit, MI (US)

(72) Inventors: Michael D. Alarcon, Markham (CA); Norman J. Weigert, Whitby (CA); Dan W. Mepham, Whitby (CA); Hongguang Sun, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 82 days.

(21) Appl. No.: 15/415,094

(22) Filed: Jan. 25, 2017

(65) Prior Publication Data
US 2018/0210193 A1    Jul. 26, 2018

(51) Int. Cl.
*G02B 27/00* (2006.01)
*G03B 17/02* (2006.01)

(52) U.S. Cl.
CPC ......... *G02B 27/0006* (2013.01); *G03B 17/02* (2013.01); *G03B 2205/0061* (2013.01)

(58) Field of Classification Search
CPC .... H02N 2/166; G02B 27/0006; G03B 17/02; G03B 2205/0061
USPC ........................................................ 359/508
See application file for complete search history.

(56) References Cited

U.S. PATENT DOCUMENTS

| | | | |
|---|---|---|---|
| 4,387,973 A | 6/1983 | Martin | |
| 5,155,625 A | 10/1992 | Komatsu et al. | |
| 7,095,160 B2* | 8/2006 | Uchino | H02N 2/08 310/323.03 |
| 7,142,373 B2* | 11/2006 | Noguchi | G02B 7/10 359/694 |
| 7,307,372 B2* | 12/2007 | Uchino | H02N 2/08 310/323.04 |

(Continued)

FOREIGN PATENT DOCUMENTS

| | | |
|---|---|---|
| CN | 201253616 Y | 6/2009 |
| CN | 201850226 U | 6/2011 |

(Continued)

OTHER PUBLICATIONS

First Office Action for related co-pending Chinese Application No. 201510912611.8 dated Aug. 21, 2017 with English language translation; 13 pages.

(Continued)

*Primary Examiner* — Stephone B Allen
*Assistant Examiner* — Rahman Abdur

(57) ABSTRACT

A self-cleaning lens system disposed adjacent a camera is disposed. The system may incorporate a piezoelectric (PZT) lens system having a first PZT element secured to a first peripheral portion of the lens element, which may be responsive to an alternating current (AC) signal applied to the first PZT element. An AC signal may excite the first PZT element to cause shear displacements in opposite longitudinal directions and to create an oscillating shear motion for the first PZT element. The oscillating shear motion may cause an oscillating rotational movement of the lens element that removes the environmental element from a surface of the lens element.

4 Claims, 2 Drawing Sheets

(56) References Cited

U.S. PATENT DOCUMENTS

| | | | |
|---|---|---|---|
| 7,565,716 B2* | 7/2009 | Watanabe | G11B 7/121 |
| | | | 15/300.1 |
| 8,330,327 B2* | 12/2012 | Asano | H02N 2/166 |
| | | | 310/323.01 |
| 8,980,010 B2 | 3/2015 | Ifuku et al. | |
| 2009/0207493 A1* | 8/2009 | Ohashi | B08B 7/02 |
| | | | 359/507 |
| 2011/0073142 A1 | 3/2011 | Hattori et al. | |
| 2011/0228389 A1* | 9/2011 | Ohashi | G02B 27/0006 |
| | | | 359/507 |
| 2012/0243093 A1* | 9/2012 | Tonar | H01L 41/0973 |
| | | | 359/507 |
| 2013/0120861 A1* | 5/2013 | Park | G02B 15/14 |
| | | | 359/824 |
| 2014/0033454 A1 | 2/2014 | Koops et al. | |
| 2016/0109412 A1 | 4/2016 | Borigo et al. | |
| 2016/0170203 A1 | 6/2016 | Weigert et al. | |

FOREIGN PATENT DOCUMENTS

| | | |
|---|---|---|
| CN | 102267419 A | 12/2011 |
| CN | 103309129 A | 9/2013 |
| CN | 103448684 A | 12/2013 |
| DE | 69002495 T2 | 1/1994 |
| DE | 102014200219 A1 | 7/2015 |
| DE | 102016002578 A1 | 9/2017 |
| FR | 2841488 A1 | 1/2004 |

OTHER PUBLICATIONS

First Office Action for related co-pending German Application No. 10 2018 101 367.1 dated Jan. 16, 2019; 10 pages.

* cited by examiner

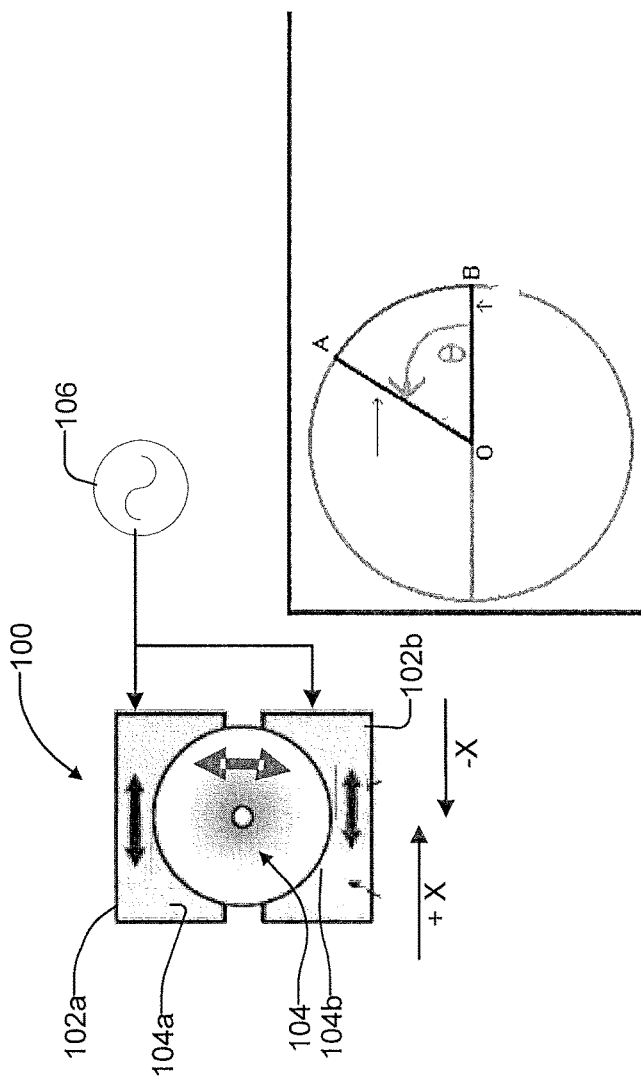
FIG. 3
FIG. 4
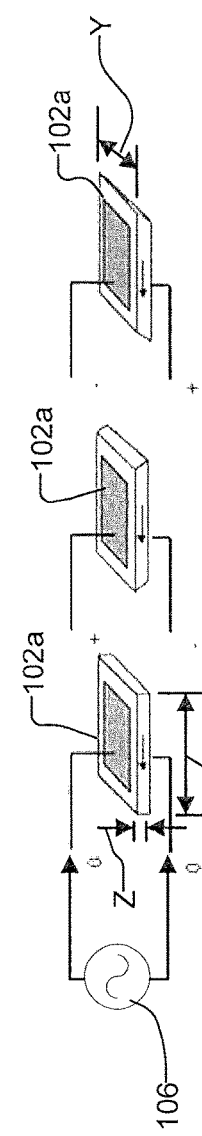
FIG. 6
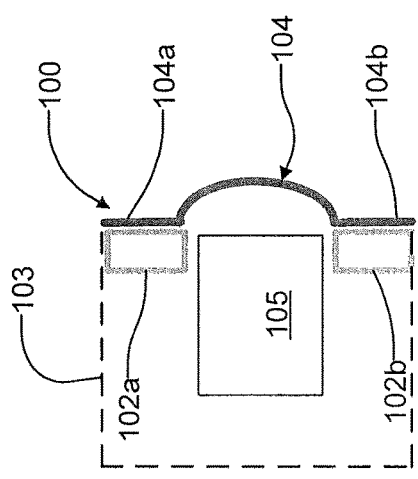
FIG. 5A
FIG. 5B
FIG. 5C

SYSTEM AND METHOD FOR UTILIZING INERTIAL FORCE FOR WATER DISPLACEMENT

FIELD

The present disclosure relates to systems and methods for cleaning camera lenses, and more particularly to a system and method which is able to clean a camera lens in extreme weather conditions involving continuous.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many current and future features to be employed on motor vehicles rely on the ability of a camera carried on the vehicle to clearly view a scene in proximity to the vehicle, for example directly or partially behind the vehicle. Camera wash cleaning technology that are used to clean a rear camera are not designed for extreme weather conditions such as severe rain, heavy snow, sleet, or heavy dust or dirt. A significant challenge exists in providing a mechanism that is able to continuously clean a camera lens under such conditions.

Various attempts at addressing the challenge of keeping a camera lens clean during heavy rain, snowfall, etc., have involved the use of air pumps for applying a direct, continuous airflow onto the lens, as well as various types of lens coatings designed to shed water (hydrophobic/hydrophilic), and shape memory alloy (SMA) wipers. Each of these approaches has been met with only limited success.

Thus, there remains a need for a highly compact camera system that is able to continuously clean a lens of a camera during heavy rainfall, snowfall, sleet, and other inclement weather conditions, and to perform the cleaning in a manner that does not obstruct the image being obtained by the camera, and which provides a highly compact assembly that can be easily integrated into a variety of body panels and/or body components of a motor vehicle.

SUMMARY

In one aspect the present disclosure relates to a self-cleaning lens system disposed adjacent a camera. The system may comprise a piezoelectric lens system. The piezoelectric lens system may include a lens element, and a first PZT element secured to a first peripheral portion of the lens element that may be responsive to an alternating current (AC) signal applied to the first PZT element. The AC signal may excite the first PZT element to cause shear displacements in opposite longitudinal directions and create an oscillating shear motion for the first PZT element. The oscillating shear motion may cause an oscillating rotational movement of the lens element that removes the environmental element from a surface of the lens element.

In another aspect the present disclosure relates to a self-cleaning lens system disposed adjacent a camera. The system may comprise a piezoelectric (PZT) lens system disposed adjacent an imaging component. The piezoelectric lens system may include a lens element, a first PZT element secured to a first peripheral portion of the lens element, a second PZT element secured to a second peripheral portion of the lens element at a location which is different from a location of the first peripheral portion. The first and second PZT elements may be responsive to an alternating current (AC) signal applied simultaneously to the first and second PZT elements. The AC signal may excite the first and second PZT elements to cause shear displacements of the first and second PZT elements in opposite longitudinal directions, and create an oscillating shear motion for each of the first and second PZT elements. The oscillating shear motions may work together to cause an oscillating rotational movement of the lens element that removes the environmental element from a surface of the lens element.

In still another aspect the present disclosure relates to a system for a self-cleaning lens system disposed adjacent a camera. The system may comprise a lens element, an electric motor that may include a stator, and a rotor having a central opening. The lens element may be secured to the rotor to be rotated by the rotor. Rotation of the rotor may cause environmental elements that have landed on the lens element to spin off from the lens element.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a side view of a piezoelectric lens system positioned on a housing [where the piezoelectric lens system] to produce an oscillating rotational motion of a lens;

FIG. 4 is a plan view of the piezoelectric lens system of FIG. 3 illustrating two piezoelectric elements secured to the lens element;

FIGS. 5A-5C illustrate how the shear mode affects the piezoelectric element to produce a deformation that results in a linear, oscillating shear motion when an alternating current signal is applied to the piezoelectric element; and FIG. 6 is a simplified diagram illustrating how the arc length is obtained as part of the determination of the shear displacement.

In the drawings, reference numbers may be reused to identify similar and/or identical elements.

DETAILED DESCRIPTION

Figure 1:
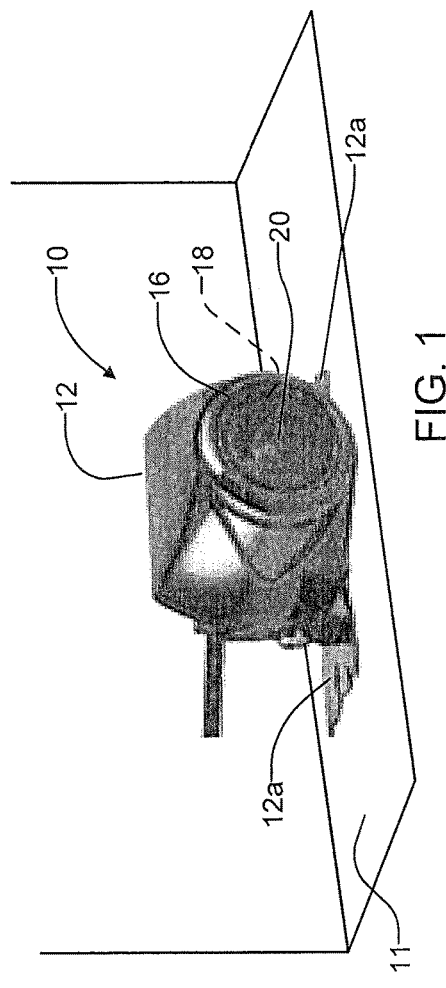
FIG. 1 is a perspective view of an example of a camera system according to the present disclosure, positioned on an exterior body panel of a motor vehicle.
Figure 2:
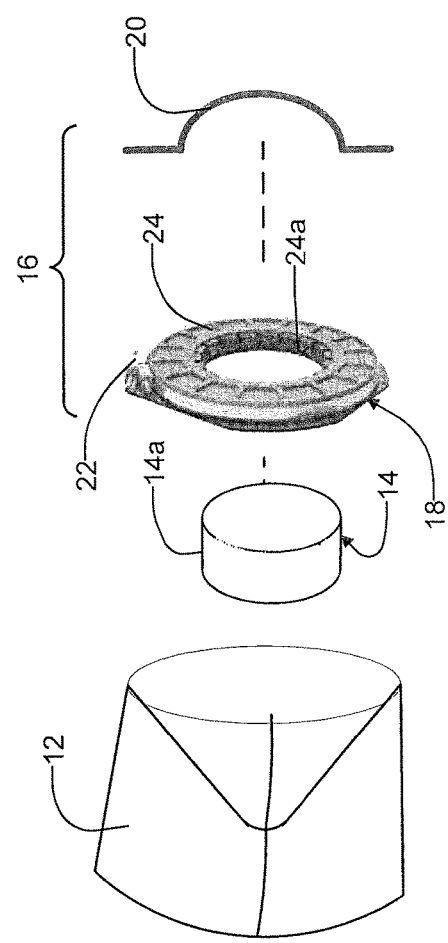
FIG. 2 is an exploded perspective view of a high speed spinning lens assembly of the camera system of FIG. 1, along with a housing and camera.

Referring to FIGS. 1 and 2, a camera system 10 includes a housing 12 which houses an imaging component, for example an internal camera 14, which is visible only in FIG. 2. The housing 12 may be secured to a body panel of a vehicle or to any suitable structure where the camera system 10 is to be used. To help in mounting the housing 12, legs 12a may be provided which can be fastened to the housing 12, or which may form an integral portion of the housing 12, by using independent fastening elements (e.g., threaded fasteners, adhesives, etc.) or any other suitable attachment components. The legs 12a may enable the housing 12 to be supported fixedly on a body panel 11 associated with the vehicle or structure with which the camera system 10 is being used, through the use of additional fasteners or attachment components (not specifically shown in FIG. 1).

A self-cleaning, spinning lens assembly 16 is also operably coupled to the housing 12. The lens assembly 16 includes a compact electric motor 18 and a lens element 20 that is secured to the rotor and rotated at a high rate of speed by the motor 18. In one embodiment the motor 18 rotates the lens element 20 at a speed between about 2500 rpm-7500 rpm, and more preferably about 5000 rpm. However, it will be appreciated that this speed may vary significantly to meet the needs of a specific application. The high speed rotational motion of the lens element 20 uses inertia to "spin off" or throw environmental elements that land on the lens element 20 off of the lens element virtually instantaneously. The environmental elements may include droplets of rain water, sleet, snow, dirt and even dust particles, which land on the lens element 20.

The high speed spinning action imparted to the lens element 20 is able to remove rain water, sleet, snow and even dust and dirt particles from the lens element without the need for a separate fluid (e.g., washer solution or air) to be applied to the lens element, such as by a spray nozzle. This enables the lens element 20 to remain sufficiently clear during rain storms, sleet, snow storms, and even in dusty conditions, so that the imaging ability of the internal camera 14 is not compromised. The spinning lens assembly 16 provides the added benefit of not requiring any external washer fluid or air source to perform its cleaning action on the lens element 20.

With particular reference to FIG. 2, the highly compact construction of the lens assembly 16 is achieved through the use of a flat or "pancake" motor configuration for the motor 18 of the assembly. The motor includes a stator 22 having a highly compact axial length, and a rotor 24 which also has a compact axial length. The rotor 24 rotates within a portion of the stator 22. Importantly, the rotor 24 includes a central opening 24a. The diameter of the central opening 24a is such that a field of view of the internal camera 14 is unobstructed of the rotor 24. Preferably, the diameter of the central opening 24a is about the same dimension as the outer diameter 14a of the internal camera, or possibly just slightly greater (e.g., 0.005 inch-0.100 inch) than the camera outer diameter 14a to ensure that no obstruction will occur even if the mounting of the internal camera 14 within the housing 12 is just slightly off center of an axial center of the rotor 24. The internal camera 14 may be mounted partially, or even fully, within the central opening 24a of the rotor 24. A peripheral area of the lens element 20 may be secured to portions of the rotor 24, and thus the lens element is able to be rotated by the rotor.

Referring to FIGS. 3 and 4, a self-cleaning piezoelectric lens system 100 for use with the internal camera 14 is shown in accordance with another embodiment of the present disclosure. Instead of using an electric motor to achieve rotation of a lens component, the system 100 makes use of a pair of shear mode piezoelectric ("PZT") elements (i.e., transducers) 102a and 102b arranged on opposing sides, and secured to peripheral portions, of a lens element 104. The lens element 104 may be similar or identical in construction to the lens element 20 of the spinning lens assembly 16. In one example, the lens element 104 has a diameter of about 14 mm, although this dimension may vary widely to meet the needs of a specific application. The PZT lens system 100 may be partially supported within a housing 103 in which a camera 105 is mounted.

As shown in FIG. 3, portions 104a and 104b of the lens element 104 may overlay and be secured, such as by adhesives or via any other suitable fastening components, to surfaces of the PZT elements 102a and 102b. Those edge portions of the lens element 104 that are not secured via adhesives to the PZT elements 102a and 102b may be sealed with a suitable weatherproof sealant (e.g., silicone) so that the entire peripheral edge of the lens element 104 is sealed against the ingress of water, snow, sleet, dust and dirt particles into the housing 105. The shear mode PZT elements 102a and 102b are commercially available from various sources, for example APC International, Ltd. of Mackeyville, Pa.

With brief reference to FIGS. 5A-5C, a principal of operation of the PZT elements 102a is illustrated, with it being understood that the action of PZT element 102b is identical but opposite to that of PZT element 102a. The operation of PZT element 102b is opposite to PZT element 102a because PZT element 102b is flipped over (i.e., upside down), relative to PZT element 102a. When an AC signal 106 is applied to PZT element 102a, a length "X" and thickness "Z" changes in accordance with the change in polarity of the AC signal. The magnitude of change in the X direction is dependent on how many layers of shear mode PZT material are being used to construct the PZT element 102a, along with a magnitude of the applied input AC signal 106. FIG. 5A shows the PZT element 102a with the AC signal at the neutral (i.e., zero crossing point), and no shear motion or deformation of the PZT element is occurring. FIG. 5B shows how the shear motion or deformation of the PZT element 102a looks when an AC voltage with a first polarity is applied to it, and FIG. 5C shows how the shear motion looks when an AC voltage with a second polarity, opposite to the first polarity, is applied to the PZT element 102a. In the FIGS. 5B and 5C it can be seen that the PZT element 102a is deformed such that the opposing surfaces of the PZT element 102a move in different directions. This feature is used to affect an oscillating rotational movement on the lens element 104. As mentioned above, the PZT elements 102a and 102b are secured to the lens element 104 with one of the PZT elements 102a or 102b being flipped over, or upside down, relative to the other. But both of the PZT elements 102a and 102b are still positioned in a common longitudinal plane. As a result, when a common AC signal is applied simultaneously to both PZT elements 102a and 102b, this causes an oscillating "shear" motion for each PZT element 102a and 102b, which in turn causes an oscillating, rotational movement of the lens element 104 within the common longitudinal plane. In effect, the shear motion affecting PZT element 102b in FIG. 4 will cause it to move in a positive X direction while the shear motion of PZT element 102a causes it to move in a negative X direction during one half cycle of the AC signal 106, which in this example is a 50 KHz signal. As the AC signal 106 changes polarity, then the PZT element 102b will move in the negative X direction while PZT element 102a simultaneously moves in the positive X direction during the next half cycle, which in turn causes a rotational motion of the lens element 104 in the opposite rotational direction. The oscillating rotational movement of the lens element 104 that is produced by the PZT elements 102a and 102b is thus in accordance with the frequency of the AC signal 106.

In one embodiment the degree of rotational movement of the lens element 104 achieved when simultaneously applying a 50 KHz AC signal to both of the PZT elements 102a and 102b is only about 0.00019 degrees, but when using an oscillating sine wave AC signal 106 of about 50 KHz, simulation has shown that a maximum rotational speed of about +/−5 rpm is achieved with only the 0.00019 degree of rotational motion. Simulation has revealed that a 50 KHz saw tooth AC waveform may produce a greater degree of rotational movement of about 0.0015 degrees, and a maximum rotational speed of +/−5 rpm, although the time to "spin off" a water droplet from the surface of the lens element 104 is about the same in either instance. These rotational and speed figures can be explained as follows.

The radius of the lens element 104 center in this example is about 12 mm. The tangential acceleration at each of the PZT elements 102a and 102b is constant for a saw tooth waveform. Therefore:

$$a_t = r \, d\omega/dt = 0.012 \cdot 104720 \approx 128 \text{ g at a maximum angular speed of 5 rpm}$$

It follows then that the maximum rotation angle is 0.00015 degrees if the frequency is 50 KHz.

If applying a sine wave pattern, the maximum tangential acceleration at either of the PZT elements 102a or 102b can be expressed as:

$$a_{t,max} = r \, d\omega/dt = 0.012 \cdot 164493 \approx 201 \text{ g at a maximum angular speed of 5 rpm.}$$

It follows then that the maximum rotation angle is 0.00019 degrees if the frequency is 50 KHz.

Similarly, simulation has revealed that even a much larger rotational movement of about 0.3 degrees of the lens element 104, which produces a corresponding +/−10,000 rpm angular speed for the lens element 104, does not significantly influence the spin off time in removing a water droplet from the surface of the lens element 104. For example, assume that a water droplet is present on the lens element 104 and is located about 3 mm from the center of the lens element, then:

even at a maximum angular speed of 5 rpm (0.5 rad/s) schedule, then:

$$d\omega/dt \approx \pm 104720 \text{ rad/s}^2; \text{ and}$$

at a tangential direction $a_t = r \, d\omega/dt = \pm 0.003 \cdot 104720 \approx \pm 32$ g.

As such, the separation of the water droplet from the lens element 104 surface is due mainly to the acceleration of gravity. Put differently, the water droplet doesn't rotate at approximately the same speed as the lens element 104 surface. In fact, the water droplet rotational speed ends up being significantly less than the rotational speed of the surface of the lens element 104 due to extremely high tangential acceleration of the surface of the lens element 104. As such, the water droplet no longer adheres to the surface of the lens element 104. On the other hand, the gravitational acceleration principally gives rise to the water droplet to be spun off of the surface of the lens element 104. Simulation result has also confirmed that the spin off time for the water droplet is about the same regardless if a saw tooth waveform producing a 0.3 degree of rotational movement (with a +/−10,000 rpm maximum speed) is used to rotate the lens element 104, or whether a sine wave producing only a 0.00019 degree rotational movement (with a +/−5 rpm maximum speed) is used. Furthermore, Simulation result has revealed that the exact location of the water droplet on the lens element 104 does not significantly influence its spin off time; instead, gravitational acceleration affecting the water droplet is the dominant factor in achieving spin off of the water droplet from the surface of the lens element 104.

With brief reference to FIG. 6, considerations to be taken into account in achieving a 0.00019 degree rotational movement will be explained. The arc length "s" can be expressed by the following formula:

$$s = r \cdot \theta$$

For a 0.00019 degree movement (equal to $3.31613 \times 10^{-6}$ radians) using a lens element 104 having a radius of 12 mm (0.012 m), where "θ" is expressed in radian, the arc length, "s", in this example is $3.97935 \times 10^{-8}$ meters. The required shear displacement "S" of the PZT element 102a (or 102b) along the X axis in FIG. 5a has to be at least this distance (i.e., at least about $3.97935 \times 10^{-8}$ meters). The shear displacement "S" can be expressed as, $$\Delta L_{shear} = n \, d_{15(GS)} L_{shear} \text{ Displacement of shear actuator [m]}$$

$d_{15(GS)}$ Shear deformation coefficient [m/V]
n Number of stacked ceramic layers
V Operating voltage [V]
GND Ground
P Direction of polarization
E Electric field strength
for n=1, a shear deformation constant ($d_{15(GS)}$ in millivolts) of $590 \times 10^{-12}$, and an input voltage (V) of 100, a shear displacement ($\Delta L_{shear}$) = $5.9 \times 10^{-8}$ meters can be achieved, which is more than sufficient to achieve the desired displacement (S) along the X axis of at least about $3.97935 \times 10^{-8}$ meters.

As noted above, the foregoing calculations for determining the shear displacement ($\Delta_{shear}$) are for one PZT plate or wafer which forms the PZT element 102a or 102b. It will be appreciated that two or more PZT wafers may be stacked on one another and mating surfaces secured together, for example by adhesives, to amplify the shear displacement for a given amplitude voltage applied to the stacked PZT assembly. Since the overall thickness (i.e., Z dimension) of the stacked PZT assembly will be greater than it would be for a single PZT wafer, this factor needs to be taken into consideration in the packaging of the system 100. In one embodiment of the system 100, each of the PZT elements 102a and 102b may have a length (X direction) of about 15 mm, a width (Y direction) of about 12 mm-15 mm and a thickness (Z direction) of about 1 mm. However, these dimensions may be varied considerably to tailor the PZT elements 102a and 102b to a specific application and to optimize packaging of the system 100. The dimensions of the PZT elements 102a and 102b, and whether they are each formed by single layer PZT wafers or multiple layers of PZT wafers, will also depend in part on the dimensions of the lens element 104. And while the PZT lens system 100 has been described in connection with the use of two independent PZT elements 102a and 102b, in some applications it may be acceptable to make use of only a single PZT element for providing the oscillating rotational motion to the lens element 104.

The various embodiments described herein thus enable a lens element covering a camera lens to be rotated using PZT elements or a compact electric motor to spin off environmental elements such as rain water droplets, sleet, snow, and even dust and dirt particles, due to the oscillations imparted to the lens element 20 or 104. The system 100 provides the added advantage of being sealed so that water or contaminants cannot enter into the volume separating the lens element 104 and the camera.

And while the system has been described in connection for use with motor vehicles, it will be appreciated that the various embodiments described herein could be implemented with little or no modification in applications involving stationary cameras that make use of a lens element that will be exposed to rain, snow, sleet and other contaminants, and where the camera needs to be able to provide clear images for an imaging application. As such, the various embodiments may find utility not just on moving vehicles such as motor vehicles, marine vehicles, aircraft and rotorcraft, but also buildings or other fixed structures, or possibly even in connection with hand held cameras that need to be used in inclement weather conditions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A self-cleaning lens system, comprising:
   a camera;
   a housing that is secured to a body panel of a vehicle and that houses the camera; and
   a piezoelectric (PZT) lens system that is secured to the housing, and including:
   a lens element;
   a first PZT element that is secured to a first peripheral portion of the lens element;
   a second PZT element that is secured to a second peripheral portion of the lens element and that is flipped upside down relative to the first PZT element,
   wherein the lens element includes additional peripheral portions that are not secured to either of the first and second PZT elements; and
   a weatherproof sealant sealing the additional peripheral portions of the lens element,
   wherein the first and second PZT elements are secured at points 180 degrees apart from one another around a circumference of the lens element,
   wherein the first and second PZT elements are responsive to one alternating current (AC) signal that is applied simultaneously to the first and second PZT elements; and
   the one AC signal exciting the first and second PZT elements to cause shear displacements of the first and second PZT elements in opposite longitudinal directions, thus creating an oscillating shear motion for each of the first and second PZT elements, the oscillating shear motions together causing an oscillating rotational movement of the lens element that removes environmental elements from a surface of the lens element,
   wherein the oscillating shear motion produces an oscillating rotational speed of about five revolutions per minute (rpm) for the lens element.

2. The self-cleaning lens system of claim 1, wherein the oscillating shear motion results in an oscillating rotation of up to 0.00019 degrees of the lens element.

3. The self-cleaning lens system of claim 1, wherein the first and second PZT elements are positioned in a common plane.

4. The self-cleaning lens system of claim 1 wherein the self-cleaning lens system does not include a spray nozzle configured to dispense fluid onto the lens element.

* * * * *